Feb. 16, 1937.   J. BIJUR   2,070,574
LUBRICATION
Filed July 2, 1934   2 Sheets-Sheet 1
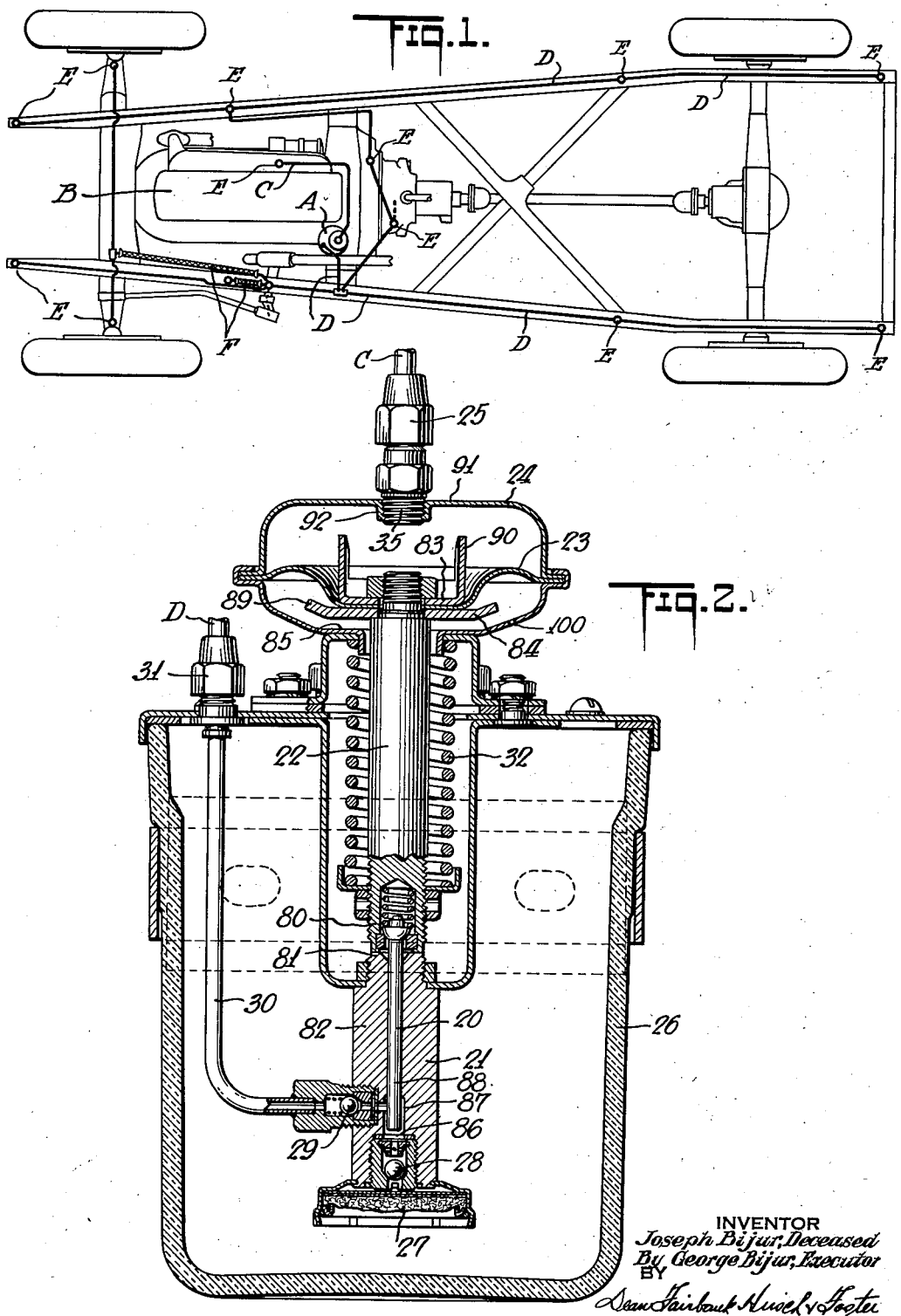
INVENTOR
Joseph Bijur, Deceased
By George Bijur, Executor
BY
ATTORNEYS

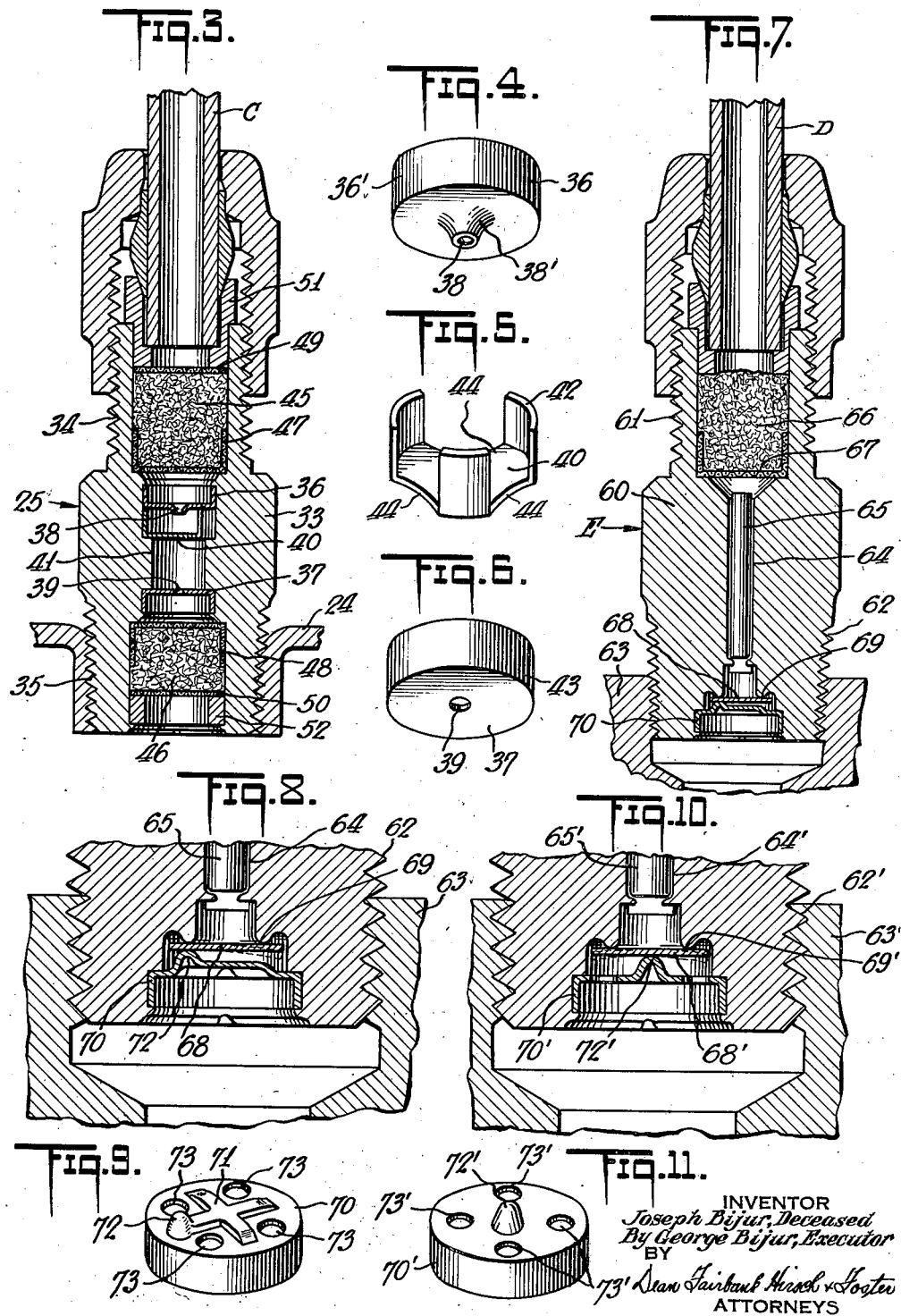

Patented Feb. 16, 1937

2,070,574

UNITED STATES PATENT OFFICE 2,070,574

LUBRICATION

Joseph Bijur, deceased, late of New York, N. Y., by George Bijur, executor, New York, N. Y., assignor to Auto Research Corporation, a corporation of Delaware Application July 2, 1934, Serial No. 733,443

12 Claims. (Cl. 184—7)

In lubricating the bearings of automobile chassis and of other similar bearings on other mechanisms, lubricating systems have been used including an intermittently discharged manually operated pump, a branched piping system and distributing outlets, which outlets tended to regulate the amount of lubricant supplied to each bearing as disclosed in United States Patents Nos. 1,632,771 and 1,632,772.

When it was, however, desired to lubricate the bearings continuously, difficulty was experienced in preventing an excess of lubricant being supplied to the bearings, thereby causing dissatisfaction due to dripping on the ground, soiling of the automobile or other mechanism, and seepage of the lubricant onto other parts of the automobile or mechanism, where its presence was not desired.

In continuously feeding lubricant to chassis bearings or similar bearings, which, for example, only require a few drops of lubricant for several hours running, it was not found readily possible to obtain a pump which would continuously feed lubricant into the piping system automatically at the desired rate, nor was it found easy to provide a distribution system to regulate the relatively minute feed from the pump into the piping system and proportion such feed from the piping system through said distributing outlets into the bearings in the predetermined proportions desired.

Intermittent pumps which were manually or automatically driven to discharge into the piping system only at relatively widely spaced intervals would not most satisfactorily give continuous lubrication, since the bearings would receive a large excess of lubricant at times of pump discharge while at intervening times they would receive no lubricant at all.

With automobile chassis lubricating systems, it has been proposed to utilize either foot pumps or hand pumps, inertia pumps, pumps driven from the engine, or from the vacuum created by the engine, but these pumps, unless most carefully designed, have supplied an undesired excess of lubricant to the chassis bearings at certain periods during running and at other periods have not supplied enough lubricant.

These difficulties were accentuated in the case of automobiles, because of the differences in level between the bearings of an automobile often amounting to six to eight inches and also because of the varying atmospheric temperatures to which an automobile chassis is subjected. Often the viscosity of the lubricant for the chassis bearings would vary from one to several hundred times in units of viscosity measurement from summer temperatures to normal winter temperatures.

If the system were arranged so as to supply just a sufficient amount of lubricant in summer time and the pump was adjusted for this purpose, an insufficient amount of lubricant would be supplied in winter time due to the increased viscosity of the lubricant in the chassis distributing system. On the other hand, if the system and the pump were adjusted to supply sufficient lubricant in winter time with high lubricant viscosities, an excess of lubricant would be supplied in winter time with the many disadvantageous results, above stated.

It has now been found that satisfactory continuous lubrication may be had of the chassis bearings of an automobile by utilizing a reciprocating pump with a small diameter plunger and by actuating the motor of said pump from the variations in the intake manifold vacuum normally occurring upon movement of the automobile.

To achieve this result it has been found necessary to regulate the resistance of the restriction metering outlets so they will have a much higher range than heretofore thought necessary, their range of resistance being sufficient not only to make negligible the total resistance or obstruction effect of the distributing piping lines leading from the pump to the bearings, but also to create a sufficient back pressure at the outlet of the pump to cause said pump to discharge against a substantially constant pressure during most of its operation at any predetermined temperature.

In actuating the pump by the variation in the intake manifold vacuum, while the car is in operation, as contrasted to the difference in pressure in the intake manifold vacuum between such times as when the engine is not operating and when it is operating, it has been found desirable to control the flow of gaseous fluid between the manifold and the diaphragm motor for the pump by a baffling connection including a small plate opening through which the gas must pass to impinge therebeyond upon a baffle plate.

By the utilization of a baffle construction of this character, rather than an elongated crevice restriction, a most satisfactory relationship between the discharge of the pump and the variations of the manifold vacuum is obtained so that the discharge of the pump will suffice without excess for the requirements of the chassis bearings supplied.

In this connection it has been found desirable to regulate the volume of the lubricant between the pump and the high restriction or drip plug outlets so that this volume will have a predetermined relation to the rate of discharge of the pump, and at the same time the piping should be so constructed that the resilient capacity of the line will also bear a predetermined relationship to the rate of discharge of the lubricant.

To prevent leakage and to assure that the piping system be maintained substantially filled with lubricant, small disk-shaped valves are preferred. It has been found desirable to utilize a disk valve, a portion of which may float but another portion of which should closely be connected to or pressed against part of the valve seat.

In the accompanying drawings in which are shown one or more of various possible embodiments of the several features of the invention, Fig. 1 is a diagrammatic plan view of an automobile chassis with the lubricating installation of the present invention in position thereon;

Fig. 2 is a side sectional view of the pump unit upon an enlarged scale.

Fig. 3 is a longitudinal sectional view of a damper device for the central pump upon an enlarged scale;

Figs. 4, 5 and 6 are respectively perspective views of elements of the damper device of Fig. 3 upon an enlarged scale removed therefrom;

Fig. 7 is a longitudinal sectional view of a metering device to proportion the lubricant to the various chassis bearings.

Fig. 8 is a fragmentary sectional view upon an enlarged scale, similar to the lower portion of Fig. 7.

Fig. 9 is a top perspective view of the valve retainer of Fig. 8 on an enlarged scale.

Fig. 10 is a view similar to Fig. 8 of an alternative embodiment also upon an enlarged scale, illustrating a modified valve retainer construction, and Fig. 11 is a top perspective view of the valve retainer construction of Fig. 10 upon a slightly enlarged scale.

Referring to Fig. 1, the central pump A, carried on the engine B of the automotive vehicle is provided with a vacuum line C. Pump A feeds the conduit system D, said conduit system D having the flexible hoses F and a plurality of flow metering outlets E to the bearings to be lubricated.

The central pump A (see Fig. 2) is provided with a piston 20 which rides in a central vertical bore in the cylinder block 21. The piston 20 is connected by the rod 22 to the diaphragm 23. The diaphragm 23 is clamped at its periphery to the sides of the casing 24.

The upper side of the diaphragm 23 is connected to the intake manifold vacuum conduit C through the vacuum controller 25. The diaphragm 23 during operation of the engine will assume a floating position with the vacuum being balanced by the spring 32.

As shown, the pump 20—21 is immersed in the glass reservoir 26 and is provided with an inlet filter 27, an inlet check valve 28 and an outlet check valve 29. The outlet conduit 30 is provided with an outlet connection 31 to the conduit system D of Fig. 1.

The present invention is particularly directed to the coordination of the vacuum controller 25 of Figs. 3 to 6 with the flow metering outlets, indicated at E in Fig. 1 (shown in detail in Figs. 7 to 11).

The vacuum in the intake manifold of the engine B will vary continuously, for example over a range of 5 to 10 inches, during operation of the engine, depending upon the position of the throttle, upon whether or not the automobile is travelling on level ground, upgrade, or downgrade, and also depending upon the speed, power output, and operating characteristics of the engine.

The diaphragm 23 of Fig. 2 is of such area and sensitivity and is so balanced by the spring 32 that it would normally tend to follow without substantial lag or inertia the variation in the intake manifold vacuum.

It has been found, however, that the variations in the intake manifold vacuum does not directly vary in proportion to the lubricant requirements of the bearings, so that it is desirable to have the diaphragm follow only certain components of the variation of the intake manifold vacuum. This has been found to be most satisfactorily accomplished by modifying and controlling the impulse from the intake manifold vacuum as it is transmitted to the diaphragm motor 23—24.

In prior applications Serial No. 468,790, filed July 18, 1930 and Serial No. 523,668, filed March 19, 1931, it was proposed to utilize an elongated crevice-like restriction passage to damp the transmission of vacuum impulses to the diaphragm motor, but for the purposes of the present application, it has been found most satisfactory to utilize a baffling construction.

The preferred construction will most effectively utilize the power of the intake manifold vacuum, and at the same time will cause the feed of lubricant into the distributing system at a rate more nearly in accordance with the need of the chassis bearings both winter and summer, whether the car is travelling at a high speed or low speed, on relatively level ground or over hilly or rolling terrain, or in heavy or light traffic.

In Figs. 3 to 6 the vacuum controller 25 is shown in large scale. As shown, this vacuum controller 25 is provided with a body 33, each end of which is threaded, as indicated at 34 and 35. The threaded end 34 enables connection to the tubing C, while threaded portion 35 enables connection to the casing 24.

The body 33 is interiorly provided with a central passage containing the cups 36 and 37. The base of the cup 36 is provided with a small central opening 38 and the cup 37 is similarly provided with a small central opening 39. These cups are shown in enlarged scale in Figs. 4 and 6.

Between the openings 38 and 39 in the cups 36 and 37 is positioned the baffle 40 which is best shown in perspective in Fig. 5. The restriction openings in the cups 36 and 37 tend to cause a convergence and increase in the speed of the gaseous stream in flowing therethrough while the baffle 40 placed between the openings 38 and 39 and in the passage 41 of enlarged bore will break-up such converged stream and assure a reduction in velocity of the stream.

The arrangement of the restriction openings 38 and 39 and the intervening baffle 40 will not substantially clog even though high obstruction effects be attained and even though the gas flowing therethrough carries a considerable amount of dirt or dust in suspension.

In the embodiment shown, the baffle 40 is positioned more closely to the restriction opening 38 than to the restriction 39, and as shown, the restriction opening 38 is formed in a nozzle 38', directed toward the baffle 40.

It will be noted that the cups 36 and 37 and the baffle plate 40, are respectively provided with the cylindrical flanges 36', 43 and 42 by means of which they may be definitely positioned in the stepped central passage 41 through the body 33 of the baffle fitting 25.

The flange 42 of the baffle plate 40 is provided with a series of openings 44, which permit free flow at the periphery of the central passageway 41 through the body 33.

The filters may be of wire screening or of cotton felt encased by wire screening, the latter being shown at 45 and 46 in Fig. 3.

It will be noted that the wire screening takes the form of cups 47 and 48, which interiorly hold the felt 45 and 46 and the flat screens 49 and 50 which exteriorly hold the felt. The annular members 51 and 52 fitted in the ends of the central passageway in the body 25 hold the screens 49 and 50 in position.

It will be noted that the cross-sectional area of the filters 45 and 46 is substantially greater than the passageway through the tubing C, so that adequate flow area may be provided through the filters and so that the flow of fluid between the vacuum motor and the intake manifold will only be obstructed at the restriction cups 36 and 37.

It has been found that the restriction baffle arrangement of the element of Figs. 3 to 6 has the effect of controlling the transmission of the variations in the intake manifold vacuum to the sensitive diaphragm 23 of the diaphragm motor 23—24, so that said diaphragm will not exactly follow the variation in the intake manifold vacuum, but will only follow it to such an extent that a relatively better controlled supply of lubricant will be fed to the chassis distributing system consisting of a piping D and the outlets E shown in Fig. 1.

When the diaphragm oscillates on either side of its floating position, it will cause a reciprocation of the plunger 20. The plunger 20 will suck in lubricant from the reservoir 26 past the inlet valve 28 and discharge lubricant past the outlet valve 29 into the pipe 30 and from the pipe 30 through the outlet connection 31 into the lines D and to the drip plug or restriction outlets, best shown in Figs. 7 to 11.

The restriction outlets of Figs. 7 to 11 must afford such high obstruction to the flow of lubricant, as to substantially altogether overcome the variant obstructing effect of the piping lines and of the bearings. And this must be accomplished even though the pump in its reciprocating movement will only feed lubricant to the chassis distributing system at a rate, for example, of about six cubic centimeters of lubricant per hour or 0.2 cubic centimeters per minute.

At the same time it is necessary to control the obstructing effect of the drip plug or high restriction fittings, indicated at Figs. 7 to 11, and indicated at E in the system, shown in Fig. 1, so that the resistance of the system as a whole will not impede the operation of the pump 20—21 and the vacuum motor 23—24 from the intake manifold of the engine, even though the lubricant in the system may increase as much as 100 times in viscosity from summer to winter conditions, with the result that there will be a back pressure of 50 to 100 pounds in the distributing system in winter time as compared to a pressure of one-half to one pound in summer.

It has been found that this high obstructing effect is most conveniently obtained when the restricting effect or obstructing action of the metering outlets to the flow of lubricant is of the order of 100 to 1000 times the maximum obstruction afforded by the tightest bearing and/or by the longest length of pipe between the pump and the farthest bearing in the line of flow.

In Fig. 7 the fitting E is provided with a body 60 having a threaded inlet end 61 for connection to the pipe D of the lubricating system and a threaded outlet end 62 for connection to the bearing structure 63.

The fitting is provided with a central passage 64 which is substantially filled by a pin 65, forming an annular passageway of extremely minute dimensions, preferably of the order of 1/1000 of an inch in width and about one inch in length. The diameter of the pin 65 and the passage 64 are both determined with a high degree of accuracy, respectively by diamond drawing dies and by high speed drilling.

The inlet end of the restriction passage is preferably provided with a filter or strainer 66 which may be provided with a mesh backing cup 67 while the outlet end is protected by the check valve 68 held at a point on its periphery between the annular valve seat 69 and the valve retainer 70.

In Figs. 8 and 9 is shown the valve 68 and the valve retainer 70 of Fig. 7 on a substantially larger scale.

In the lubricating system of the present invention, it has been found desirable to prevent leakage of oil by a check valve which will not afford any substantial restriction or obstruction to the flow of lubricant. The seating pressure of the valve should be much less than the minimum pressure in summer necessarily to maintain a continuous flow of lubricant, namely, less than about ½ to 1 pound per square inch so that the valves will have a negligible effect in regulating the flow of oil as between the different drip plugs.

At the same time, however, the valves must seat certainly to prevent any leakage of oil, particularly at very low heads as of the order of six inches, as may be encountered in chassis lubricating systems. In chassis systems, the uppermost bearings may only be six inches, or more, above the lowermost bearings, and it is between these bearings at different levels that a syphoning action may be set up during periods of idleness of the car, causing air to be drawn in through a higher outlet and lubricant to be emitted through a lower outlet with gradual drainage of the piping lines.

Although it has been proposed to utilize flap valves of fibrous materials in which a disk is cut out of a sheet of material, said sheet being clamped in position and the disk being connected to the sheet by a tongue; and also freely floating disk valves in which the entire disk is free of any mechanical connection to the valve chamber and may freely reciprocate between the valve seat and the valve retainer; for the present purpose, it has been found satisfactory to utilize disk valves in which the entire disk has been severed from the sheet of material, and in which the valve retainer is provided with means to hold a part of the valve periphery against its seat when flow is not taking place.

By using this valve arrangement it has been found possible to make the valve most readily seat to check return valve by the resiliency of the fibrous material and by return fluid impulses with assurance that admission of air to the lubricant system will be substantially avoided.

Referring to Figs. 8 and 9, the valve disk 68 may be formed of a fibrous material, such as paper, silk, cambric, and so forth, which desirably may be coated with a lacquer or resinous material, such as hardened linseed oil, oil-resistant resins, and so forth.

The valve retainer 70, shown best in Fig. 9, is of cup-shape and on its surface facing the valve is provided with a cruciform projection 71. From the end of one of the arms of said cruciform projection extends upwardly the mound or projection 72, which presses the valve disk 68 adjacent its periphery against the annular valve seat 69.

The openings 73 are positioned between the arms of the cruciform projection 71 and assure free egress of lubricant from the valve chamber even when the valve is pressed against said retainer and away from its seat 69.

In Figs. 10 and 11 is shown another embodiment of a valve retainer, in which the similarly functioning elements are referred to by the same numerals as in Figs. 7 to 9, except that they are primed. A central projection 72' on the retainer presses the disk 68' upwardly against its seat 69'.

It will be noted, referring to Figs. 7 to 11, that the valve disks 68 and 68' are readily moved from the seats 69 and 69' upon the flow of lubricant through the drip plugs E to the dotted line positions, respectively indicated in Figs. 8 and 10. In this position the lubricant may flow freely to the bearing. At the same time as soon as the lubricant is stopped, the resiliency of the disks 68 and 68' will cause substantially immediate seating of the valve.

In operation, the intake manifold vacuum will vary about an average value and this variation will come through the baffler 25 and be transmitted to the diaphragm motor 23, 24. During the operation of the engine the vacuum in the casing 24 of the motor will be sufficient to cause the diaphragm 23 to draw up the pump plunger 20, the diaphragm assuming a floating position against the resistance of the spring 32. With variations in vacuum as come through the baffler 25 the diaphragm will move upwardly and downwardly causing reciprocation of the plunger 20 and drawing lubricant in through the filter 27 and the inlet check 28 on upstrokes and forcing it out past the outlet valve 29 and the conduit 30 to the distributing system D of Fig. 1. The lubricant feed in the distributing system D will be proportioned by the restriction passages 64, 65 of the drip plugs E among the various bearings.

In the periods between operation of the pump 20 the disk valves 68 and 68' will be resiliently held against their seats 69 and 69'. At the same time as soon as the operation of the pump is initiated, these valves will be partly pressed away from the seats 69 and 69' to the dotted line positions shown in Figs. 8 and 10, permitting flow to the bearings.

Referring to the vacuum operated pump of Fig. 2, it will be noted that there it is shown in its position when the engine has ceased operating and when the pump connection rod is stopped at its lower end 80 against the top 81 of the pump body 82.

By stopping the connecting rod 22 in its position, assurance is had that the lower diaphragm clamp member 84 will always be positioned above the bottom 85 of the motor casing 24, and that the lower end 88 of the pump plunger 20 will be stopped a predetermined distance above the bottom portion 86 of its cylinder 87.

It will be noted that the lower clamp member 84 is dished as at 89 so as to conform to the shape of the bottom 85 of the motor casing 84. The upper clamp member 83 is provided with the flange extensions 90 which will contact with the roof 91 of the diaphragm chamber 24, limiting upward movement of the diaphragm and preventing too great a movement of it with the ordinary engine vacuum. It will be noted that the flanges strike the roof 91 annularly around the downturned flange 92, which is interiorly threaded to receive the threaded portion 35 of the baffle member 25.

By forming the opening in the roof 91 with the flange 92, assurance is had that the baffle fitting cannot be forced by threading thereinto sufficiently to rupture the casing 24. It will be noted that the baffle fitting 25 and the outlet fitting 31 both extend upwardly so that it is most convenient to connect the conduits C and D thereto respectively.

Although the pump and distributing system of the present invention may be applied to other installations than automobile chassis and to the lubrication of mechanisms in general, the system shown being utilized with other pumps, or the pump shown in Fig. 2 being utilized with other systems, it has been found most convenient in chassis lubrication to form the pump of such dimensions that the plunger will have a diameter of about $\frac{5}{32}$ inch, and a stroke of about $\frac{3}{32}$ to $\frac{1}{16}$ inch. A preferred embodiment of the pump plunger will reciprocate at a rate of about two to three strokes per minute during operation of the motor vehicle, with a discharge of 0.2 c. c. per minute or 6 c. c. per hour.

With a pump of these dimensions it is found desirable to regulate the lubricant capacity and resiliency of the lines so that a continuous and constant pressure will be obtained at the outlets E. In one desirable embodiment the piping D had a volume capacity of about 75 to 100 c. c. and a resilient capacity of about 2 to 6 c. c. The piping system may be formed of aluminum or copper tubing having an external diameter of $\frac{3}{32}$ to $\frac{5}{32}$ inch and an internal diameter of $\frac{1}{16}$ to 0.0106 inch. With such a system the lubricant was desirably selected so as to have a viscosity of 1000 to 3000, or more preferably, 1500 to 3000 Saybolt seconds, at 100° F.

With the systems described above, it was found desirable always to restrict the pump discharge so that it would be about less than ½ and preferably less than $\frac{1}{10}$ of the resilient capacity of the line.

In the motor construction 23, 24 in such a device, the diaphragm 23 preferably has an effective area of about 1½ to 2½ inches, while the baffle members 36 and 37 of the member C are respectively provided with openings of 0.01 to 0.02 inch and 0.005 to 0.015 inch and spaced ⅛ to ¼ inch apart.

A vent hole 100 in the diaphragm casing (see Fig. 2) permits ready venting of the reservoir 26 which is in communication with the diaphragm chamber below the diaphragm 23. The washer 84 being of relatively large diameter will cover the vent hole 100 and prevent anyone sticking a pin or sharp pointed tool through this vent hole, which might puncture the diaphragm. By providing the vent hole 100 at the high level, as indicated, the vent hole will be well above the level of lubricant and the possibility of the breathing action of the diaphragm forcing bubbles of oil through the vent hole will be altogether avoided. The vent 100 is particularly well baffled from a splashing action of the oil in the reservoir.

It is to be understood that the vacuum baffle regulator 25, although shown connected to the diaphragm casing 24, may also be positioned in other parts of the line C and, for example, it may be connected at the other end of the line where the line is connected to the intake manifold.

The pump discharge may be readily charged by a charge in the regulator unit 25, it having been found practical to supply three standard regulators or baffle means 25 each with different restriction orifices. For example, the size of the pump is arranged to supply an average amount of oil (say about 6 c. c. per hour) with the medium capacity regulator. Then if it is required to reduce the quantity of oil delivered (say to 4 c. c. per hour) the same pump and diaphragm would be used but with a smaller capacity regulator unit.

For increased delivery (say to 8 c. c. per hour) there would be utilized a larger capacity regulator. These regulators may be conveniently externally numbered or marked so as to indicate their ratings, a convenient numbering system being one for the low capacity regulator, one and one-half for the medium capacity regulator, and two for the large capacity regulator.

In varying the effect of the regulator it has been found most convenient to vary the opening of the hole 39 in the cup 37. The supplementary orifice 38 in the cup 36 and the baffle 40 may serve primarily to protect the main restriction 39 from the collection of small particles of dirt which might occasionally pass through the felt filter 45. The hole 38 in the cup 36 is preferably somewhat larger than the hole 39 in the plate 37, and it is desired to obtain sufficient air velocity at this first hole 38, so that the air impinging on the baffle 40 will throw out dirt particles by centrifugal action.

One of the primary advantages of the present application resides in the fact that the construction permits the operation of a pump, the plunger of which moves at relatively low speed, by an engine or mechanism of relatively high speed, such as the engine structure, without the use of complicated mechanical reduction gearing. By obtaining a slow operating pump of this character it is possible to use reasonable dimensions for the piston, the cylinder and the valves, as shown in Fig. 2.

This application is a continuation in part of prior applications Serial No. 468,790 and Serial No. 523,668, now Patent No. 1,998,438 of April 23, 1935 filed respectively July 18, 1930 and March 19, 1931, both of which prior applications disclose chassis lubricating pumps feeding a drip plug system, the pumps being actuated by diaphragm motors which reciprocate with variations in the intake manifold vacuum.

What is claimed is:—

1. A central chassis lubricating system actuated by the vacuum in the intake manifold, comprising a conduit system for distributing lubricant to the various bearings, a pumping device supplying lubricant for said conduit system, a pressure-responsive device for actuating said pumping device, a fluid line connecting said pressure-responsive device with the intake manifold and a flow baffle device in said line.

2. A central chassis lubricating system actuated by the vacuum in the intake manifold, comprising a conduit system for distributing lubricant to the various bearings, a pumping device supplying lubricant for said conduit system, a pressure-responsive device for actuating said pumping device, a fluid line connecting said pressure-responsive device with the intake manifold and a flow baffle device in said line, said baffle device including an elongated fitting with inlet and outlet filters and with intervening restriction means and baffle means.

3. A gaseous-fluid-operated liquid distributing system comprising a source of varying gaseous fluid pressure, a pressure-responsive device, a baffled gaseous fluid conduit from said source of varying pressure to said pressure-responsive device, an obstructed liquid distributing system and means to connect said pressure-responsive device to said liquid distributing system.

4. A central lubricating system actuated by the variation of pressure in the engine intake comprising a lubricant distributing conduit system, a plunger pump, a conduit connecting said diaphragm with said engine intake and a plurality of restrictions with an intervening baffle in said conduit including an orifice and filters cooperating with said restrictions to prevent clogging thereof.

5. In a lubricant distributing system, a pump, a motor case, a diaphragm therein and rigidly attached thereto at its rim, means connecting the upper face of the diaphragm with a vacuum and means connecting the lower face of the diaphragm to the atmosphere, said former means consisting of a tapped inturned nipple receiving a threaded baffle fitting.

6. A plunger pumping arrangement for a liquid distributing system comprising a connecting rod, a plunger, a longitudinal pumping block provided with a central longitudinal bore adapted to receive and discharge liquid to be distributed, a socket at one end of said block, an elongated extension of said bore in the upper part of said socket forming a bearing for said plunger, a tapped socket in the other end of said block adapted to receive an inlet valve and valve seat and a socket adapted to receive an outlet valve seat and to serve as a means of connection for an outlet conduit, said connection rod being stopped by the top of said block.

7. A suction motor for a pump of a lubricating installation, said pump being of the type including a connecting rod, a plunger moved thereby and a cylinder block receiving said plunger, comprising a capsule, a diaphragm having its rim rigidly clamped in place therein, the central portion of said diaphragm being stiffened by upper and lower plates, said diaphragm presenting an annular fold between said stiffened portion and the rim thereof, and upper and lower stop means limiting the displacement of the central part of the diaphragm, the upper stop means including flanges from the upper plate, and the lower stop means being formed by contact between the connecting rod and the cylinder block.

8. A fluid pressure system, a source of varying fluid pressure, a member receiving said varying fluid pressure and a conduit system connected to said source, said system including a baffle device including an elongated fitting with inlet and outlet filters and with intervening restriction means and baffle means.

9. A fluid pressure system, a source of varying fluid pressure, a member receiving said varying fluid pressure and a conduit system connected to said source, said system including a baffle device, including a plurality of restrictions with an intervening baffle having an orifice therein and filters cooperating with said restrictions to prevent clogging thereof.

10. In a fluid conduit system, a baffle arrangement comprising an elongated fitting having a central passage therethrough and a plurality of plates blocking said passage, one of said plates being provided with a central orifice and another of said plates being provided with a series of peripheral orifices.

11. In a fluid conduit system, a baffle arrangement comprising an elongated fitting having a central passage therethrough and a plurality of plates blocking said passage, said plates being at least three in number, the two outside plates being provided with central orifices and their central plate being provided with a peripheral orifice.

12. In a fluid conduit system, a baffle arrangement comprising an elongated fitting having a central passage therethrough and a plurality of plates blocking said passage, said plates being at least two in number and one being provided with a central orifice and the other being provided with a plurality of peripheral orifices, the central orifice being formed in a nipple projecting toward the plate having the peripheral orifice.

GEORGE BIJUR,
*Executor of the Estate of Joseph Bijur, Deceased.*